United States Patent
Thorvaldsson et al.

(10) Patent No.: US 9,081,657 B2
(45) Date of Patent: Jul. 14, 2015

(54) APPARATUS AND METHOD FOR ABSTRACT MEMORY ADDRESSING

(75) Inventors: Vilhjalmur S. Thorvaldsson, Arlington, VA (US); Sveinn V. Grimsson, Newport Beach, CA (US); Ragnar H. Jonsson, Laguna Niguel, CA (US); Trausti Thormundsson, Irvine, CA (US); Sverrir Olafsson, Newport Beach, CA (US)

(73) Assignee: CONEXANT SYSTEMS, INC., Irvine, CA (US)

( * ) Notice: Subject to any disclaimer, the term of this patent is extended or adjusted under 35 U.S.C. 154(b) by 702 days.

(21) Appl. No.: 13/273,122

(22) Filed: Oct. 13, 2011

(65) Prior Publication Data

US 2013/0097405 A1    Apr. 18, 2013

(51) Int. Cl.
*G06F 12/02* (2006.01)
*G06F 9/34* (2006.01)

(52) U.S. Cl.
CPC ...... *G06F 12/02* (2013.01); *G06F 9/34* (2013.01); *G06F 12/0292* (2013.01)

(58) Field of Classification Search
CPC ........ G06F 12/02; G06F 12/0292; G06F 9/34
USPC ..................... 711/6, 206, 208, 216
See application file for complete search history.

(56) References Cited

U.S. PATENT DOCUMENTS

| 4,466,056 A * | 8/1984 | Tanahashi ............... 711/206 |
| 4,602,328 A * | 7/1986 | Finger et al. ............ 711/206 |
| 5,136,699 A * | 8/1992 | Yokoyama ............... 711/220 |
| 2005/0165876 A1* | 7/2005 | Mukaida et al. ........... 708/523 |
| 2007/0143569 A1* | 6/2007 | Sanders et al. ........... 711/203 |
| 2007/0147144 A1* | 6/2007 | Tokiwa ................. 365/200 |
| 2012/0042145 A1* | 2/2012 | Sehr et al. ............. 711/163 |

OTHER PUBLICATIONS www.wikipedia.org; Addressing Mode; 14 pages; Nov. 30, 2011.
Ousterhout, John; Virtual Memory, Lecture Notes for CS 140, 4 pages, Spring 2010.
www.csun.edu; Base/Bound Registers; Nov. 30, 2011.
www.highbeam.com; Base-Bound Register; Jan. 1, 2004.

* cited by examiner

*Primary Examiner* — Reginald Bragdon
*Assistant Examiner* — Mehdi Namazi
(74) *Attorney, Agent, or Firm* — Haynes and Boone, LLP

(57) ABSTRACT

An apparatus for abstract memory addressing. A processor for generating an abstract memory address. A base register for storing a base memory address. An adder for adding the base memory address to the abstract memory address and generating a physical address for a device memory. A pointer register for storing the physical address, wherein the pointer register is directly coupled to the device memory.

20 Claims, 3 Drawing Sheets

200

US 9,081,657 B2

APPARATUS AND METHOD FOR ABSTRACT MEMORY ADDRESSING

TECHNICAL FIELD

The present disclosure relates to memory addressing, and more paricularly to abstract memory addressing that is not in the critical timing path for the memory.

BACKGROUND OF THE INVENTION

Abstracting of memory addresses is performed using a Memory Management Unit (MMU) that maps address values coming from the CPU to the physical memory and detects out of range memory accesses. The MMU is in the critical timing path between the pointer register and the memory, which causes delay in memory access.

SUMMARY OF THE INVENTION

The present disclosure includes an apparatus for abstract memory addressing, such that the physical address of a memory device does not need to be utilized by the processor. The processor generates a relative memory address, such as "1."

A base register stores a base memory address, such as "1000." An adder adds the base memory address to the relative memory address and generates a physical address for a device memory, such as "1001." A pointer register stores the physical address and is directly coupled to the device memory, such that a memory management unit, or any other intervening device that would be in the critical memory timing path, is not required. In addition, multiple pointer registers and base registers can be used, such that each process operating on the processor can generate the same relative or abstract memory address (e.g. "1"), and the base registers store a different physical address for accessing different sections of the memory device. In this example, one base register can be set up by the processor to store "1000," and a second base register can be set up to store "2000," such that the same relative memory address (e.g. "1") will generate two different physical addresses (e.g. "1001" and "2001"). Thus, different portions of the physical memory can be accessed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
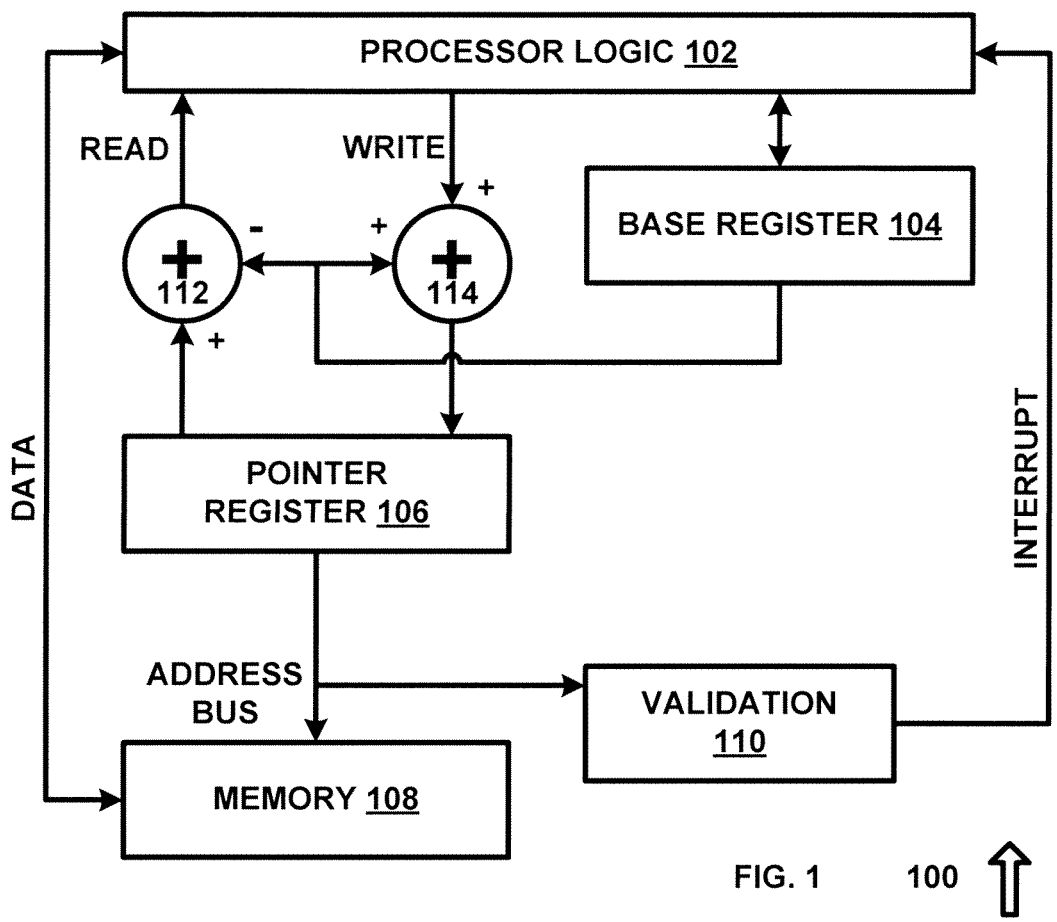
FIG. 1 is a diagram of a system for abstract memory addressing in accordance with an exemplary embodiment of the present disclosure.

In the description that follows, like parts are marked throughout the specification and drawings not be to scale and certain components can be shown in generalized or schematic form and identified by commercial designations in the interest of clarity and conciseness.

In accordance with the present disclosure, the CPU or processor uses an abstract memory address "A" for processing instead of an actual physical memory address "MA," which reduces the workload on the processor that would otherwise be required to obtain and use physical memory addresses. The abstract memory address A is first added to an associated base memory address "B" that is stored in a base register B to generate a physical memory address MA that is stored in a pointer register P and that is used to write data to or read data from the physical memory. When an abstract memory address A is to be read from the internal pointer register P by the processor, the base value B is read from the base register B and subtracted from the physical memory address MA stored in the pointer register P, and the resultant abstract memory address A is provided to the processor. There can also be multiple base registers and pointer registers.

In one exemplary implementation, the processor can use multiple base registers B[m] and pointer registers P[n] to allow multiple concurrent processes to access the physical memory, were "m" and "n" are suitable integers. For example, eight base registers (B[0] through B[7]) can be used, where each register is used to store a base memory value B that is to be added to an abstract memory address A that is used by the processor. In this exemplary embodiment, the processor also generates an associated index value I for the specific process associated with a base register B[n]-pointer register P[n] pair. The processor can also generate the starting physical memory address for the process (such as by accessing a look-up table) and can store it in the base register B[I]. The processor then causes the abstract memory address A to be added to the base memory address B stored in B[I], and the resultant physical memory address MA is then stored in the pointer register P[I] and is used to write data to or read data from the physical memory. Multiple concurrent processes can also be run with only one base register.

Likewise, when the processor wants to read an abstract memory address A from the pointer register P[n], it retrieves the index value I associated with the process, retrieves the base value B[I] associated with the index value, and subtracts that base value B[I] from the value stored in the pointer register P[n], to generate the abstract memory address A.

In another exemplary embodiment, the pointer register "P" can have a number of predetermined bits, such as three in this example, that are used to store the index value I (which can vary from 0 to 7 in this example). If P[n] is 32 bits wide (31:0), then the three most significant bits (31:29) of the abstract memory address A can be used to store the index value I, and the remaining 29 bits (28:0) can be used for the abstract memory address when it is written from the processor, and for the physical memory address after the base memory address is added to the abstract memory address. In this exemplary embodiment, loading a new bit value A into pointer register P with an associated three bit index value "I" does the following:

$$P[28:0]=B(A[31:29])+A[28:0];$$

$$P[31:29]=A[31:29];$$

where A[ ] represents the abstract memory address generated by the processor, and which includes the index value.

Reading back the value in the P[n] register returns the 32 bit abstract memory address as follows:

$$A[28:0]=P[28:0]-B(A[31:29]);$$

$$A[31:29]=P[31:29];$$

Accessing the pointer register to generate a memory address can be performed by the command:

Address=P[28:0];

In addition, memory violations can be detected, such as to ensure that an address is within a valid memory address range. In this exemplary embodiment, the upper and lower physical memory addresses associated with an index I can be stored in associated registers by the processor and used to detect memory violations using the following commands:

If (Address<LL[P[31:29]]) violation=1;

else if (Address>UL(P[31:29])) violation=1;

else violation=0;

where LL[I] and UL[I] are registers that hold the upper and lower limit of allowed memory range associated with index I. When a violation is detected, exception handling is invoked, for example by generating an interrupt, by storing a predetermined number of register entries and associated instructions in a trace buffer for subsequent debugging, or using other suitable processes. The boundary register values can be assigned for each physical memory range associated with a base register.

FIG. 1 is a diagram of a system 100 for abstract memory addressing in accordance with an exemplary embodiment of the present disclosure. System 100 can be implemented in hardware or a suitable combination of hardware and software. As used herein, "hardware" can include a combination of discrete components, an integrated circuit, an application-specific integrated circuit, a field programmable gate array, a digital signal processor or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes processor logic 102, which can be a complex instruction set computer (CISC), a reduced instruction set computer (RISC), a digital signal processor or other suitable processor logic. Processor logic 102 reads and writes to memory 108 using base register 104, which is used to provide a base value that is to be added to an abstract memory address provided by processor logic 102. In one exemplary embodiment, when processor logic 102 writes an abstract memory address value A to pointer register 106, such as when a new process operating on processor logic 102 is initiated, it also generates a physical memory address that is stored in a base register 104, which is added to the value A using adder 114. The resultant physical memory address MA is then stored in the pointer register 106. Pointer register 106 then provides the physical memory address MA that will be used to read data from or write data to memory 108.

Reading and writing to memory 108 can also cause pointer register 106 be automatically advanced, such as by being decremented or incremented to the next memory address. In order for processor logic 102 to read back the abstract memory value A, the base address stored in base register 104 is subtracted from the physical memory address value "MA" that is stored in pointer register 106 by using adder 112, and the resultant abstract memory address A is provided to processor logic 102.

Validation 110 is used to perform address validation on the output of pointer register 106. In one exemplary embodiment, validation 110 can detect when the physical memory address is greater than or lesser than a valid physical memory location. Validation 110 can generate an interrupt or other suitable signal for processing by processor logic 102 when a memory error is detected. Validation 110 can also store a predetermined number of register entries in a trace buffer for subsequent debugging, and can perform other suitable functions.

In operation, system 100 provides for abstract memory addressing without a memory management unit and without processing abstract memory address data in the critical timing path of the memory access circuit.

Figure 2:
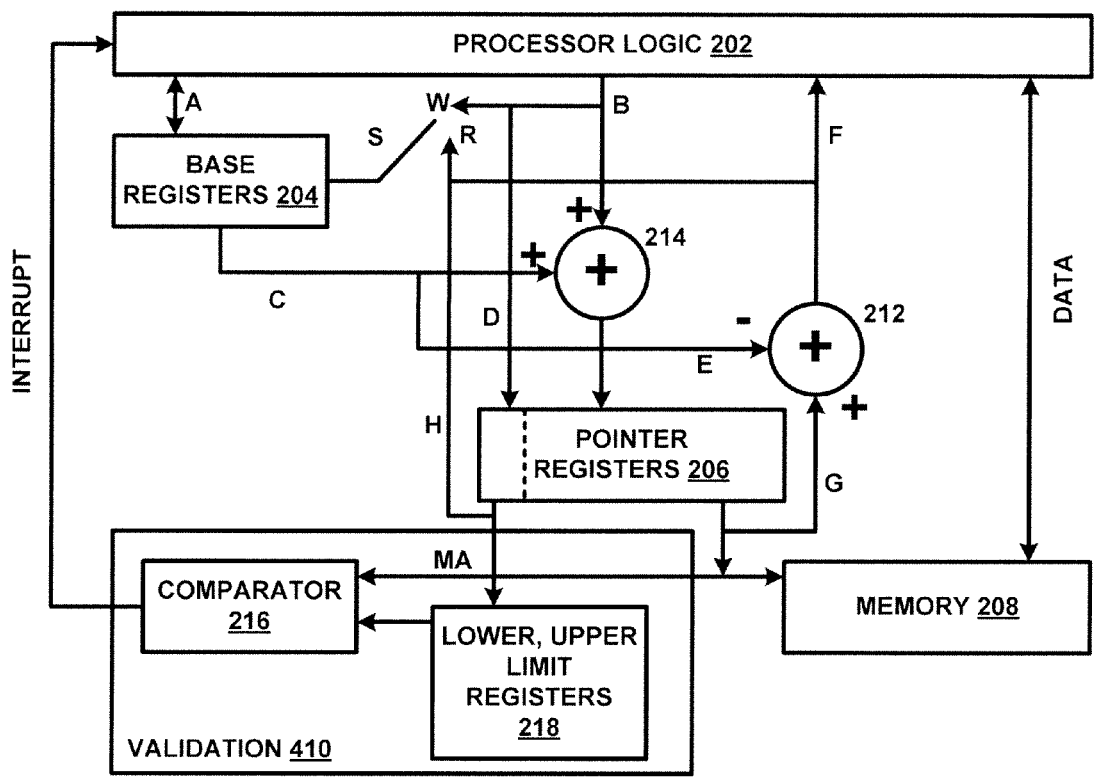
FIG. 2 is a diagram of a system for abstract memory addressing in accordance with an exemplary embodiment of the present disclosure.

FIG. 2 is a diagram of a system 200 for abstract memory addressing in accordance with an exemplary embodiment of the present disclosure. System 200 utilizes multiple base registers and pointer registers, and can be implemented in hardware or a suitable combination of hardware and software.

System 200 includes processor logic 202, which can be a complex instruction set computer (CISC), a reduced instruction set computer (RISC), a digital signal processor or other suitable processor logic. Processor logic 202 reads and writes to memory 208 using base registers 204, which are used to provide base values that are o be added to relative memory addresses provided by processor logic 202. In one exemplary embodiment, when processor logic 202 writes an abstract memory address value to one of the pointer registers 206, such as when a new process operating on processor logic 202 is initiated, it generates an index value I to assign one of the base registers 204 and one of the pointer registers 206 to the process. The index value is provided by switch S being set to position H during a data write and position R during a data read. In one exemplary embodiment, the index value I can be provided by processor logic 202 as the most significant bits of data line B, and can also be provided to an index memory section of pointer registers 206 for the associated pointer register. In this manner, a pointer register 206 can also store the index value for the base register associated with the pointer register 206.

Processor logic 202 also generates a physical memory base address that is stored in a base register 204 via data line A, which is added to the offset field of the abstract memory address value in the least significant bits from data line B using adder 214. In this exemplary embodiment, the resultant physical memory address value is then stored in the pointer register 206. Pointer register 206 then provides the physical memory address MA that will be used to read data to or write data from memory 208.

In order for processor logic 202 to read back the abstract memory value A, the base address stored in base register 204 is subtracted from the physical memory address value "MA"

that is stored in pointer register 206 by using adder 212, and the resultant abstract memory address A is provided to processor logic 202 over data line F. The index value from the pointer register 206 is provided to base registers 204 over data line H and switch 5, and the stored base address value is provided to adder 212 over data line E. The index value I is also provided to data line F over data line H, such as by routing of parallel data buses or in other suitable manners.

Validation 210 is used to perform address validation on the output of pointer register 206. In one exemplary embodiment, validation 210 can detect when the physical memory address is greater than or lesser than a valid physical memory location. Validation 210 includes lower and upper limit registers 218, which store physical data memory addresses associated with the base physical memory address in base register 204. In one exemplary embodiment, processor logic 202 stores the lower and upper physical memory addresses associated with a base register physical memory address. For example, base register 204 can include a first base register memory address of 1000 and a second base register memory address of 2000. In this exemplary embodiment, the value stored in the lower limit register for the first base register memory address would be "1000," and the value stored in the upper limit register for the first base register memory address would be "1999," such that if a physical memory address outside of this range was inadvertently generated, an interrupt would be generated. Comparator 216 compares the values stored in lower and upper limit registers 218, and generates an interrupt or other suitable data or signal if the memory address received from pointer register 206 is outside of the allowable range.

In operation, system 200 provides for abstract memory addressing without a memory management unit and without processing abstract memory address data in the critical timing path of the memory access circuit. The index values for the base registers can also be stored in the pointer registers to allow multiple base registers to be used.

Figure 3:
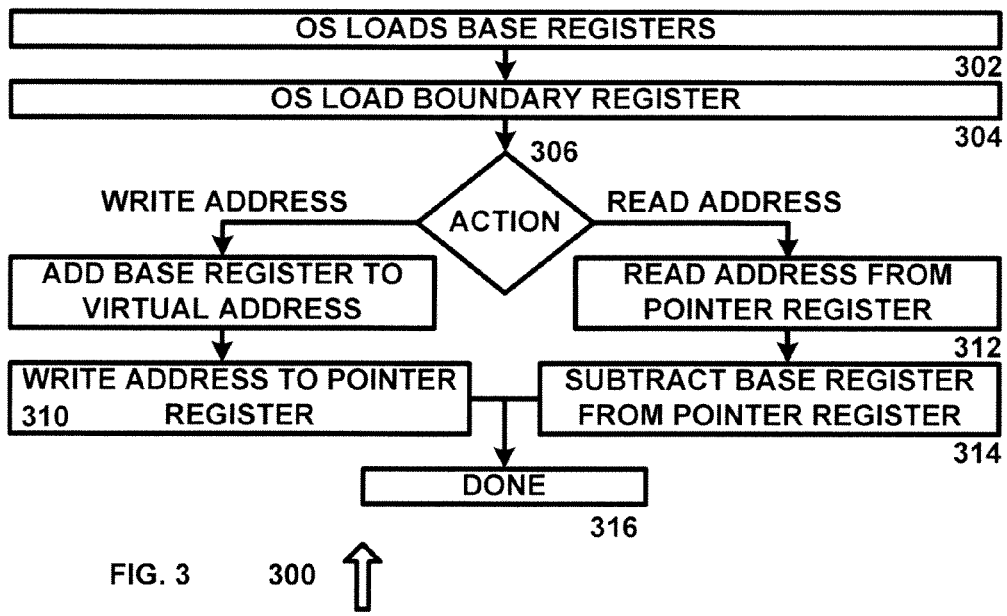
FIG. 3 is a flow chart of an algorithm for abstract memory addressing in accordance with an exemplary embodiment of the present disclosure.

FIG. 3 is a flow chart of an algorithm 300 for abstract memory addressing in accordance with an exemplary embodiment of the present disclosure. Algorithm 300 can be executed by processor logic that is used to control data memory access, pointer registers, base registers and other circuits and components.

Algorithm 300 begins at 302, where the operating system loads a base register or registers with base memory addresses. In one exemplary embodiment, the operating system can receive a request to initiate a process, and can allocate a range of memory for the process, starting with a base physical memory address and ending with a maximum physical memory address. Where multiple processes are being initiated, the sections of allocated memory can be contiguous, separate, or otherwise suitably arranged. The algorithm can also generate an index value to select the associated base register, pointer register, lower limit register, upper limit register or other suitable registers. In one exemplary embodiment, the index value can be transmitted with an abstract memory address and stored in an index section of a pointer register. The algorithm then proceeds to 304.

At 304, the operating system loads the boundary registers associated with each base register, such as to allow memory address validation. In one exemplary embodiment, the base physical memory address and maximum physical memory address associated with a portion of allocated memory can also be stored in the boundary registers. The algorithm then proceeds to 306.

At 306, it is determined whether an address read or an address write command has been received. If it is determined that an address write command has been received, the algorithm proceeds to 308 where a value from a base register is added to an abstract memory address received from the processor to create a physical memory address. In one exemplary embodiment, an index value can be set in a predetermined field of the abstract memory address by the processor and can be used to select an associated base register. The algorithm then proceeds to 310 where the physical memory address is stored in the pointer register. The algorithm then proceeds to 316 and terminates.

If it is determined at 306 that an address read command has been received, the algorithm proceeds to 312 where a pointer register value is read. In one exemplary embodiment, an index value can be received with the address read command and can be used to select an associated base register. The algorithm then proceeds to 314 where the base register value is subtracted from the pointer register value to generate the abstract memory address, which is then provided to the processor. The algorithm then proceeds to 316 and terminates.

In operation, algorithm 300 allows abstract memory addressing to be used by a processor without introducing delay in the critical timing path between the pointer registers and the memory. Algorithm 300 also allows a pointer register to include an index that is used to associate the pointer register with a base register, so as to allow abstract memory access to be performed by processes operating in parallel.

Figure 4:
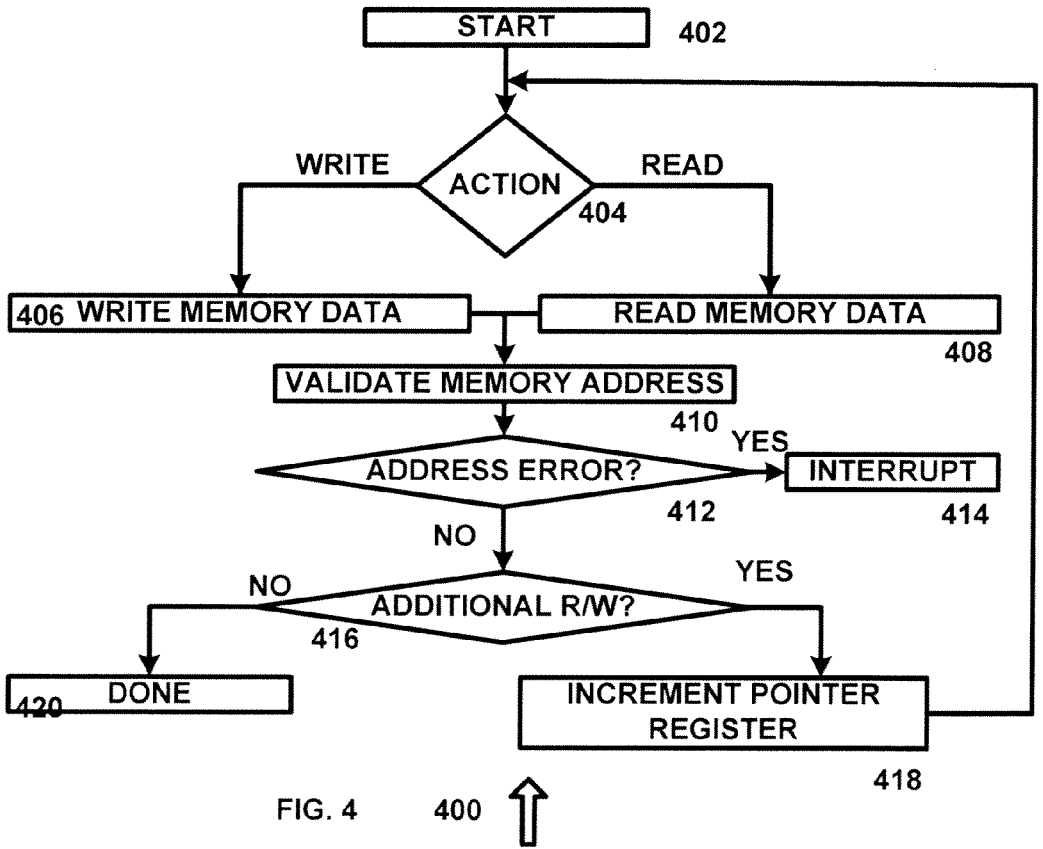
FIG. 4 is a flow chart of an algorithm for abstract memory addressing in accordance with an exemplary embodiment of the present disclosure.

FIG. 4 is a flow chart of an algorithm 400 for abstract memory addressing in accordance with exemplary embodiment of the present disclosure. Algorithm 400 can be executed by processor logic that is used to control data memory access, pointer registers, base registers and other circuits and components.

At 402, the algorithm starts and proceeds to 404, where it is determined whether data should be read from or written to the physical memory. If data is to be written to the physical memory, the algorithm proceeds to 406 where the physical memory address stored in the pointer register is used to write to the physical memory. Otherwise, if data is to be read from the physical memory, the algorithm proceeds to 408 where the physical memory address stored in the pointer register is used to read from the physical memory. The algorithm proceeds to 410 from 406 or 408.

At 410, the address is validated. In one exemplary embodiment, the address can be compared to a value stored in a lower limit register and a value stored in an upper limit register, and if the address exceeds a limit, the algorithm proceeds to 414 where an interrupt or other suitable control can be generated. Otherwise, the algorithm proceeds to 416.

At 416, it is determined whether additional read or write operations need to be performed, such as in response to a multiple read or multiple write instruction. If an additional read or write does not need to be performed, the algorithm proceeds to 420 and terminates, otherwise the algorithm proceeds to 418, where the pointer register is advanced. The algorithm then returns to 404.

In operation, algorithm 400 allows abstract memory addressing to be used by a processor without introducing delay in the critical timing path between the pointer registers and the memory.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. An apparatus for abstract memory addressing comprising:
   a processor for generating an abstract memory address;
   a base register for storing a base memory address;
   a first adder for adding the base memory address to the abstract memory address and generating a physical address for a device memory;
   a pointer register for storing the physical address, wherein the pointer register is coupled to the device memory; and
   a second adder coupled to the processor, the base register and the pointer register, the second adder for subtracting the base memory address from the physical address and generating the abstract memory address.

2. The apparatus of claim 1 further comprising an address validation system coupled to an address bus and the processor and for receiving the physical address and generating a signal if the physical address is not a valid physical address.

3. The apparatus of claim 2 further comprising a trace buffer for receiving the signal from the address validation system and storing a predetermined number of register entries.

4. The apparatus of claim 1 wherein the base register comprises a plurality of base registers and the base register is directly coupled to the processor, the first adder and a second adder.

5. The apparatus of claim 1 wherein the pointer register comprises a plurality of pointer registers, and the pointer register is directly coupled to the first adder and the second adder.

6. The apparatus of claim 1 wherein the base register comprises a plurality of base registers and the pointer register comprises a plurality of pointer registers.

7. The apparatus of claim 6 wherein the pointer register comprises:
   an address section for storing the physical address; and
   an index section for storing an index, wherein the index identifies one of the plurality of base registers.

8. A method for abstract memory addressing comprising:
   generating an abstract memory address using a processor;
   storing a base memory address in a base register;
   adding the base memory address to the abstract memory address with an adder and generating a physical address for a device memory;
   storing the physical address in a pointer register, wherein the pointer register is coupled to the device memory; and
   subtracting the base memory address from the physical address with an adder that is directly coupled to the processor, the base register and the pointer register and generating the abstract memory address.

9. The method of claim 8 further comprising receiving the physical address and generating an address invalid signal if the physical address is not a valid physical address.

10. The method of claim 9 further comprising receiving the address invalid signal and storing a predetermined number of register entries.

11. The method of claim 8 comprising storing a plurality of base addresses in a plurality of base registers.

12. The method of claim 8 comprising storing a plurality of physical addresses in a plurality of pointer registers.

13. The method of claim 8 comprising:
   storing plurality of base addresses in a plurality of base registers; and
   storing a plurality of physical addresses in a plurality of pointer registers.

14. The method of claim 13 storing the plurality of physical addresses in the plurality of pointer registers comprises:
   storing one of the physical addresses in an address section of each pointer register; and
   storing an index in an index section of each pointer register, wherein the index identifies one of the plurality of base registers.

15. An apparatus for abstract memory addressing comprising:
   a processor configured to generate an abstract memory address;
   a base register configured to store a base memory address;
   a first adder configured to add the base memory address to the abstract memory address and generate a physical address for a device memory;
   a second adder configured to subtract the base memory address from the physical address and generate the abstract memory address; and
   a plurality of pointer registers configured to store the physical address, wherein each pointer register is directly coupled to a device memory, the first adder and the second adder.

16. The apparatus of claim 15 wherein the second adder is coupled to the processor, the base register and the pointer register.

17. The apparatus of claim 15 further comprising an address validation system configured to receive the physical address and generate a signal if the physical address is not a valid physical address.

18. The apparatus of claim 17 further comprising a trace buffer coupled to receive the signal from the address validation system and configured to store a predetermined number of register entries.

19. The apparatus of claim 15 wherein the base register comprises a plurality of base registers and the base register is directly coupled to the processor, the first adder and the second adder.

20. The apparatus of claim 15 wherein one of the plurality of pointer registers comprises:
   an address section configured to store the physical address; and
   an index section configured to store an index, wherein the index identifies one of the plurality of base registers.

* * * * *